United States Patent
Wagner et al.

(10) Patent No.: US 9,311,791 B2
(45) Date of Patent: Apr. 12, 2016

(54) TACTILE FEEL CONTROL DEVICE

(71) Applicant: Raytheon Canada Limited, Ottawa (CA)

(72) Inventors: Kevin B. Wagner, Ottawa (CA); Ryan W. Nobes, Ottawa (CA)

(73) Assignee: Raytheon Canada Limited (CA)

( * ) Notice: Subject to any disclaimer, the term of this patent is extended or adjusted under 35 U.S.C. 154(b) by 239 days.

(21) Appl. No.: 13/974,870

(22) Filed: Aug. 23, 2013

(65) Prior Publication Data

US 2015/0054634 A1 Feb. 26, 2015

(51) Int. Cl.
*G08B 6/00* (2006.01)
*G09B 21/00* (2006.01)

(52) U.S. Cl.
CPC ........................................ *G08B 6/00* (2013.01)

(58) Field of Classification Search
CPC ....................................................... G08B 6/00
USPC .......................................... 340/407.1, 407.2
See application file for complete search history.

(56) References Cited

U.S. PATENT DOCUMENTS

| | | | |
|---|---|---|---|
| 6,469,692 B2 | 10/2002 | Rosenberg | |
| 7,307,619 B2 * | 12/2007 | Cunningham et al. | 345/163 |
| 7,786,977 B2 * | 8/2010 | Abe | 345/156 |
| 8,922,502 B2 * | 12/2014 | Ciesla et al. | 345/173 |
| 2010/0302017 A1 | 12/2010 | Guglielmo | |
| 2011/0205038 A1 | 8/2011 | Drouin et al. | |

FOREIGN PATENT DOCUMENTS

WO WO 2013/087267 A1 6/2013

OTHER PUBLICATIONS

PCT application PCT/IB2014/002274; filed Jun. 23, 2014; Raytheon Canada Limited; International Search Report mailed Apr. 29, 2015.

* cited by examiner

*Primary Examiner* — Eric Blount

(57) ABSTRACT

A tactile feel control device is disclosed. The tactile feel control device can include an electric motor configured to be mechanically coupled to a manual control interface that is movable by a user. The tactile feel control device can also include a bias module operable to generate a bias to be applied by the electric motor. The bias can be configured to provide a desired tactile feel to the user at the manual control interface. In addition, the tactile feel control device can include a control module operable to output a drive signal to the electric motor configured to apply the bias. The bias can be insufficient, alone, to cause movement of the manual control interface.

20 Claims, 3 Drawing Sheets

TACTILE FEEL CONTROL DEVICE

BACKGROUND

Many devices can be operated manually and such devices include a wide variety of manual interfaces operable with mechanical and/or electronic couplings to facilitate operation. In addition, some manually operated devices operable with mechanical couplings can also be operated via an electric motor, which can be used to provide powered operation independent of manual operation. For example, a modern cinematic camera may be capable of both electronic and manual control or operation, which provides for a computer to control operation of the camera through a preprogrammed sequence or for a camera operator to take "hands on" control of the camera and make manual adjustments.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
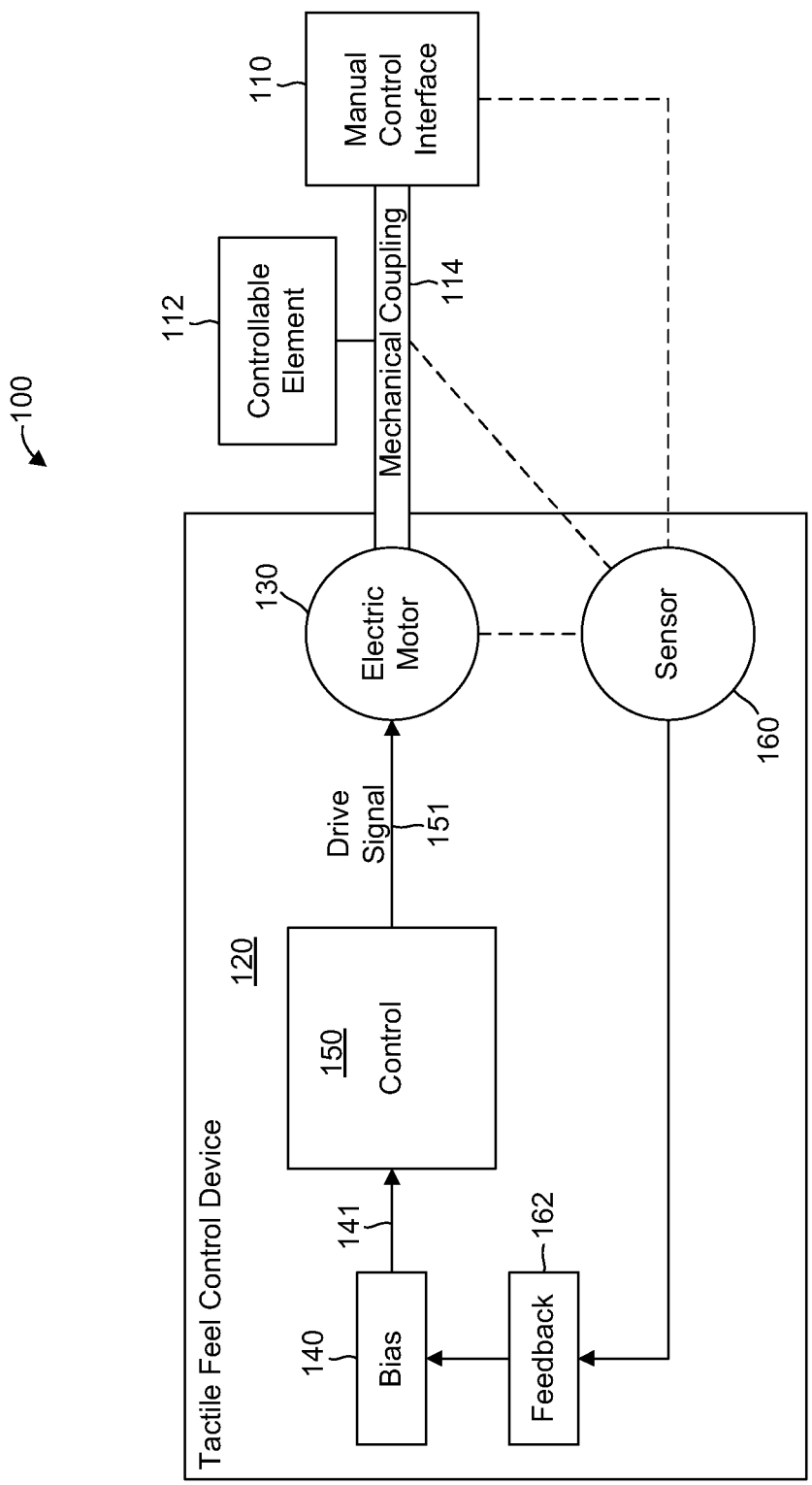
FIG. 1 is an example schematic illustration of a manually operatable system having a tactile feel control device in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although manually operated devices are indeed functional for an intended purpose, the tactile feel for users of some devices can be unpleasant. For example, excessive force from the user may be necessary to operate a device and/or the mechanical coupling of a device can feel "rough" or unrefined to the user. In the case of manual and electrically operated devices, under manual operation, the electric motor is typically "off" but is engaged and rotating under the power of the user as the user operates the device. Electric motors are typically not designed to provide a certain tactile feel when driven manually. Thus, aspects of the mechanical coupling as well as the passive electric motor can contribute to a "rough," "toothy," "coggy," and/or "uneven" tactile feel for the user. Discerning users of such devices are often put off by such an undesirable tactile feel, as it reflects an inferior quality. Therefore, improvements to the tactile feel provided by some manually operated devices can enhance the user's experience and/or meet the user's expectations of quality.

Accordingly, a tactile feel control device is disclosed that provides a desired tactile feel to the user of a manually operatable device. In one aspect, an electric motor being driven manually can be made to have a desirable tactile feel, such as by reducing or eliminating undesirable tactile feel characteristics typically resulting from manually driving an electric motor. The tactile feel control device can include an electric motor configured to be mechanically coupled to a manual control interface that is movable by a user. The tactile feel control device can also include a bias module operable to generate a bias to be applied by the electric motor. The bias can be configured to provide a desired tactile feel to the user at the manual control interface. In addition, the tactile feel control device can include a control module operable to output a drive signal to the electric motor configured to apply the bias. The bias can be insufficient, alone, to cause movement of the manual control interface.

In one aspect, a manually operatable system is disclosed. The system can comprise a manual control interface that is movable by a user and a tactile feel control device. The tactile feel control device can have an electric motor mechanically coupled to the manual control interface. The tactile feel control device can also have a bias module operable to generate a bias to be applied by the electric motor. The bias can be configured to provide a desired tactile feel to the user at the manual control interface. Additionally, the tactile feel control device can have a control module operable to output a drive signal to the electric motor configured to apply the bias. The bias can be insufficient, alone, to cause movement of the manual control interface.

One embodiment of a manually operatable system 100 is illustrated schematically in FIG. 1. The manually operatable system 100 can include a manual control interface 110 that is movable by a user and a controllable element 112 configured to be controlled by the manual control interface 110. For example, the manual control interface can comprise a knob, lever, dial, wheel, steering wheel, handle, grip, or any other suitable feature or device. In one aspect, the manual control interface 110 can be configured to mechanically move the controllable element 112, such as by a mechanical coupling 114, which can include any type of drive mechanism or drivetrain, such as a gear coupling, screw drive, rotary drive, translational drive, etc. that can cause translational and/or rotational movement of the controllable element 112 from input movements of the manual control interface 110. The controllable element 112 can be any suitable structure, feature, component, and/or element that can be driven, operated, and/or controlled by the manual control interface 110, such as a camera lens.

The manually operatable system 100 can also include a tactile feel control device 120, which can have an electric motor 130 mechanically coupled to the manual control interface 110, such as via the mechanical coupling 114 or drive mechanism. The electric motor 130 can be any suitable type of motor, such as a brushed or brushless DC motor, or a single-phase, two-phase, or three-phase AC motor. The tactile feel control device 120 can also include a bias module 140 operable to generate a bias 141 to be applied by the electric motor 130 and a control module 150 operable to output a drive signal 151 to the electric motor 130 configured to apply the bias 141.

In one aspect, the bias 141 can be insufficient, alone, to cause movement of the manual control interface 110. For example, the bias 141 can be such that the control module 150 outputs a low level drive signal 151 to the electric motor 130 sufficient to cause a torque bias on the mechanical coupling 114 without moving the mechanical control interface 110. In other words, the electric motor can be driven with enough power to provide some torque without causing the motor to rotate, for example, due to resistance from the mechanical coupling 114, the controller element 112, and/or the manual control interface 110.

In another aspect, the bias 141 can be configured to provide a desired tactile feel to the user at the manual control interface 110. For example, the torque bias can be adjusted to assist or resist movement of the manual control interface 110 to provide a desired tactile feel to the user through the manual control interface 110. In one aspect, the bias can be configured to provide a mechanically smooth drive feel by overcoming anomalies in the electric motor 130 and/or the mechanical coupling 114 that can be perceived through tactile feedback, without being high enough to cause movement of the manual control interface 110. In one aspect, the level of bias can be configured to provide a tactile feel resembling a very smooth mechanical drive. Thus, the tactile feel of the manually operatable system 100 can be improved or enhanced through an electric assist. The effect of which can be transparent to the user, who may think the device is an analog/mechanical device when it the device is actually an active digital/electromechanical device. In one aspect, however, the level of bias can be controlled or adjusted by the user to create a customized feel.

The tactile feel control device 120 can also be configured such that movement of the manual control interface 110 by the user initiates the drive signal 151 to the electric motor 130. For example, the tactile feel control device 120 can include a sensor 160 that can sense position, velocity, acceleration and/or torque of the manual control interface 110. In one aspect, the sensor 160 can be associated with the electric motor 130, the mechanical coupling 114, the controllable element 112, and/or the manual control interface 110 to sense movement of the manual control interface 110. The sensor 160 can provide feedback to a feedback module 162, which can be configured to provide feedback from the sensor 160 to the bias module 140 for adjusting the bias 141. The control module 150 can then output the drive signal 151 to the electric motor 130 configured to apply the bias 141. Thus, movement of the control interface 110 by the user can cause the electric motor 130 to apply the bias 141. In one aspect, feedback from the sensor 160 can be used to determine whether too much torque bias is being applied, such as by causing the electric motor 130 to rotate. In this case, the bias magnitude can be reduced until the bias is no longer sufficient to cause rotation of the electric motor 130. The bias 141 can therefore be static or dynamic, as described further hereinafter.

In one aspect, feedback from the sensor 160 can be used to determine a direction of movement and/or a rate of movement of the manual control interface 110, which can be used to alter or vary the bias 141 to be applied by the electric motor 130. For example, a torque bias magnitude and/or a torque bias direction can be varied depending on the movement direction and/or speed of the manual control interface 110. Thus, the torque magnitude and/or direction applied by the electric motor 130 can differ depending on the direction and/or speed of the movement of the manual control interface 110. For example, the direction of the bias 141 can be configured to assist movement of the manual control interface in one direction and to resist movement in an opposite direction, to assist movement in both directions, or to resist movement in both directions. In addition, the magnitude of the bias 141 can be asymmetric or configured to provide more assistance/resistance in one direction than in the opposite direction. In order to avoid abrupt changes in the bias 141 applied by the electric motor 130, a change of direction by the manual control interface 110 can be sensed over multiple encoder counts and the torque bias magnitude can be ramped to a final torque bias value. Thus, feedback from the sensor 160 regarding position, velocity, and/or acceleration of the manual control interface 110 can be used to actively control or influence the tactile feel to the user at the manual control interface 110, as desired. For example, the bias 141 applied by the electric motor 130 can provide a constant or consistent tactile feel to the user at the manual control interface 110 regardless of the direction of speed of the movement of the manual control interface 110. In one aspect, the manually operatable system 100 can form a closed loop system, which may include nested loops, factoring parameters of the manual control interface 110, such as position, velocity, acceleration and/or torque, into the bias 141. It should be recognized that algorithms governing the magnitude and/or direction of the bias 141 can be configured in any manner to achieve a desired implementation of tactile feel to the user through the manual control interface 110.

Figure 2:
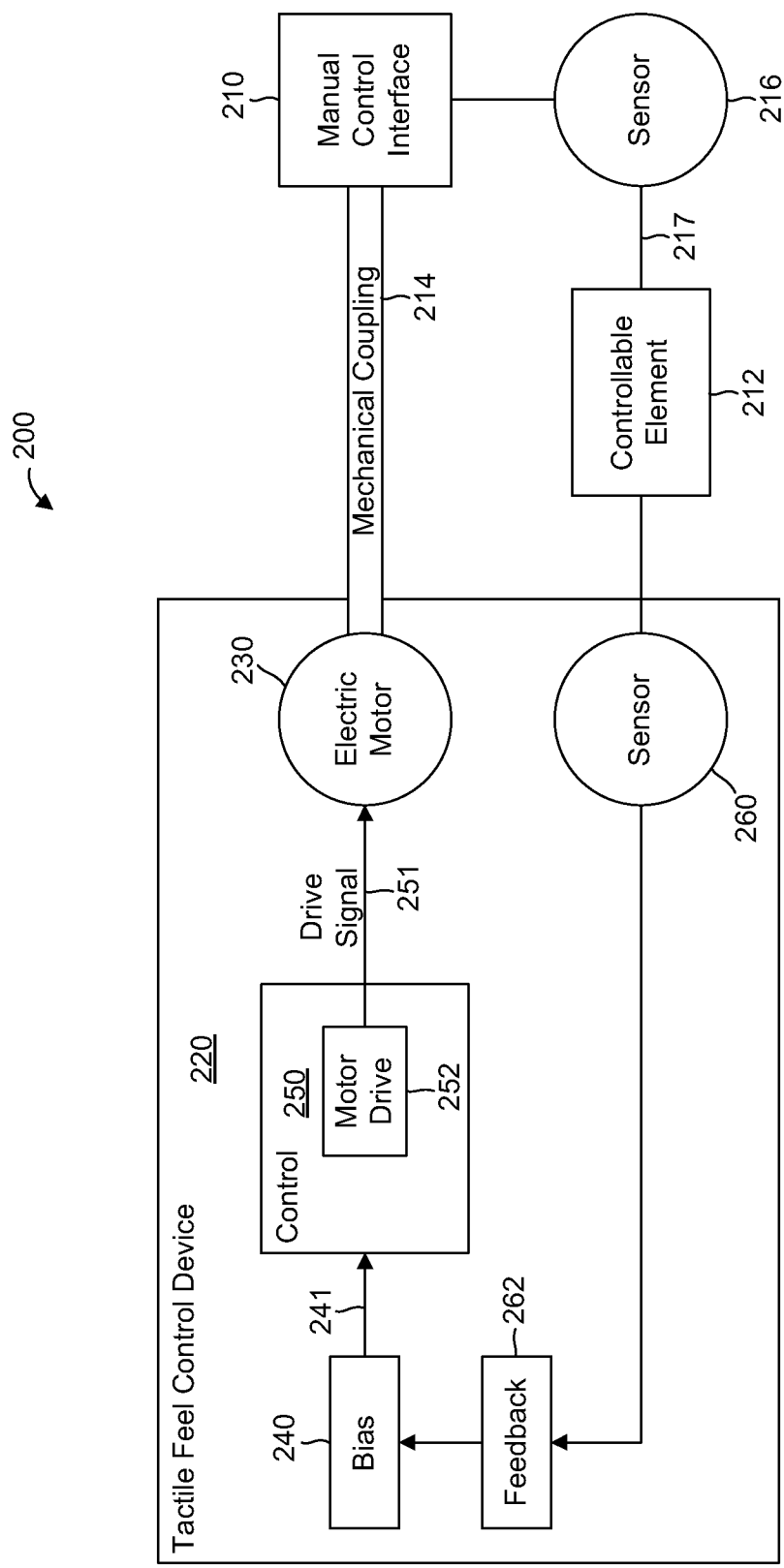
FIG. 2 is an example schematic illustration of a manually operatable system having a tactile feel control device in accordance with another embodiment of the present invention.

With reference to FIG. 2, illustrated is a schematic representation of a manually operatable system 200. The system 200 is similar in many respects to the system 100 illustrated in FIG. 1, and includes a manual control interface 210 that is movable by a user and a controllable element 212 configured to be controlled by the manual control interface 210, as well as a tactile feel control device 220 having an electric motor 230 mechanically coupled 214 to the manual control interface 210. The tactile feel control device 220 also includes a sensor 260, a feedback module 262, a bias module 240, and a control module 250 to provide a bias 241 to be applied by the electric motor 230 to the manual control interface 210 based on feedback from the sensor 260. The manually operatable system 200, however, includes a controllable element 212 coupled to the manual control interface 210 via a sensor 216, such as a position, velocity, acceleration, force and/or torque sensor, which can be configured to sense one or more such quantities from the manual control interface 210 to control the controllable element 212 using sensor information. The coupling between the sensor 216 and the controllable element 212 can be any suitable electrical and/or data coupling and may comprise a wired and/or wireless coupling.

In one example, the manual control interface 210, the sensor 216, and the controllable element 212 configuration can function as a "steer by wire" vehicle steering control. In this case, the manual control interface 210 can comprise a steering wheel and the controllable element 212 can comprise a directional control device for a vehicle, such as a steering mechanism operable to control wheels of the vehicle. The sensor 260 of the tactile feel control device 220 can be configured to sense a position, velocity, acceleration, force and/or torque of the controllable element 212 or steering mechanism to provide active feedback to the manual control interface 210 or steering wheel. Thus, sensed anomalies in the steering can be fed back to the steering wheel electronically to provide an analog to be sensed by the user to enhance steering control feel of the vehicle. In one aspect, therefore, the manually operatable system 200 can be used to emulate a mechanical device through an electronic means.

It should be recognized that the manual control interface 210, the sensor 216, and the controllable element 212 can be of any suitable configuration. For example, the manual control interface can comprise button, keypad, keyboard, touch screen, joystick, and/or any other suitable tactile control interface for operating and/or controlling a controllable element. In one aspect, the controllable element 212 can comprise a virtual element, such as a controllable aspect or feature of a video game.

In one aspect, the control module 250 can comprise a motor drive module 252 operable to output a drive signal 251 as a pulse width modulation (PWM) signal to the electric motor 230 based on the bias 241. For example, the motor drive module 252 can receive a torque magnitude and/or direction and output a PWM signal configured to cause the electric motor to rotate and/or apply a torque accordingly.

The schematic representations illustrated in FIGS. 1 and 2 illustrate two examples of a "manual mode" of operation or control over the controllable elements 112, 212, respectively. In other words, the controllable elements 112, 212 are only caused to move by input from the user via the manual control interfaces 110, 210, respectively.

Figure 3:
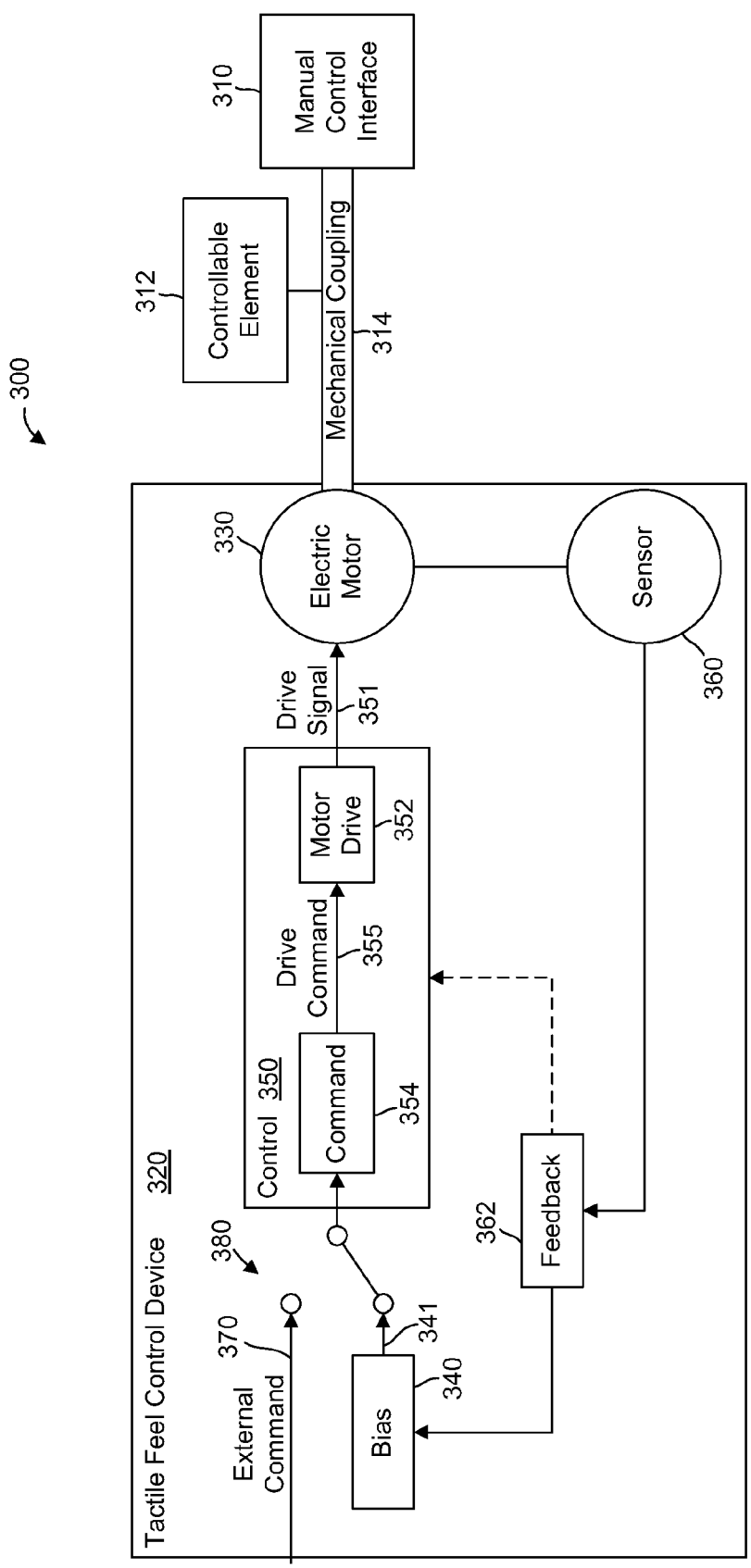
FIG. 3 is an example schematic illustration of a manually operatable system having a tactile feel control device in accordance with yet another embodiment of the present invention.

With reference to FIG. 3, illustrated is a schematic representation of a manually operatable system 300. The system 300 is similar in many respects to the system illustrated in FIG. 1, and includes a manual control interface 310 that is movable by a user and a controllable element 312 configured to be controlled by the manual control interface 310, as well as a tactile feel control device 320 having an electric motor 330 mechanically coupled 314 to the manual control interface 310. The tactile feel control device 320 also includes a sensor 360, a feedback module 362, a bias module 340, and a control module 350 to provide a bias 341 to be applied by the electric motor 330 to the manual control interface 310 based on feedback from the sensor 360. The manually operatable system 300, however, further includes the ability to receive an external command 370 that can be generated external to the tactile feel control device 320, such as from a user and/or a control device (not shown), which can operate or control the controllable element 312 independent of or in addition to the manual control interface 310. Thus, in one aspect, the external command 370 can operate the controllable element 312 in an "autonomous mode," which can be a mode of operation where a computer generates the external command 370. In one aspect, represented conceptually by a switch 380, the control module 350 can be operable to alternately receive the external command 370 and the bias 341. Accordingly, the control module 350 can be configured to output a drive signal 351 configured to apply the external command 370 or the bias 341.

The control module 350 can comprise a command module 354 configured to alternately apply the bias 341 and the external command 370, as applicable, and output a drive command 355. The control module 350 can also include a motor drive module 352, as described hereinabove, to receive the drive command 355 and output the drive signal 351. In one aspect, the drive command can comprise a torque magnitude and/or a torque direction.

When receiving the external command 370, the control module 350 can also receive feedback 362 from the sensor 360, which can govern operation of the electric motor 330 to ensure that the external command has been executed. For example, the external command 370 may direct the controllable element 312 to a certain position and feedback from the sensor 360 can identify when the controllable element 312 has reached the position, causing the electric motor 330 to cease operation. In one aspect, movement of the manual control interface 310 by the user, as sensed and communicated by the sensor 360, can be operable to override the external command 370 via the switch 380, and cause the drive signal 351 to apply the bias 341 instead of the external command 370. For example, movement of the electric motor 330, the mechanical coupling 314, the controllable element 312, and/or the manual control interface 310 that was not caused by, or is inconsistent with, the external command 370 can be identified from the sensor 360 feedback, causing the switch 380 to apply the bias 341. In another aspect, the switch 380 can be manually actuated by the user, without movement of the manual control interface 310. Thus, the system 300 can be effectively operated by computer control and by manual user control.

Due to the mechanical coupling 314 between the manual control interface 310 and the electric motor 330, movement of the manual control interface 310 causes rotation of the electric motor 330 when moving the controllable element 312. Without an application of the bias 341, the tactile feel to the user through the manual control interface 310 can be described as "rough," "toothy," or "coggy." Application of the bias 341 can therefore be configured to reduce or eliminate such undesirable aspects of the tactile feel due to the electric motor 330 and/or the mechanical coupling 314, such as backlash, to provide a tactile feel that is "smooth."

This can be beneficial, for example, in a cinematography camera, where it is often desirable to have an electronic lens drive, as well as a manual lens drive, to focus and adjust other elements of the lens. Applying a bias 341 with the electric motor 330 that is insufficient to cause rotation of the electric motor 330 can provide a tactile feel through the manual control interface 310 that resembles a well-lubricated, mechanically smooth drive. Thus, when the camera lens is manually adjusted the tactile feel to the user can be smooth, which can enhance the user's ability to accurately position the lens, as well as provide a satisfying and pleasing "high quality" feel from the camera. Instead of the electric motor 330 being merely passive or "off" when the lens is under manual control, the electric motor is "on" in that the electric motor 330 applies a small level of torque bias, which can be configured to eliminate the roughness otherwise felt when the motor is passively driven. The system 300 can therefore enhance or improve the tactile feel of an electronic drive when manually driven by using electronics and the electronic motor 330, as opposed to improving the mechanical coupling 314 or other purely mechanical elements. In one aspect, the system 300 can provide for digital control via the external command 370 as well as a manual control that has an analog or mechanical drive feel.

In one aspect, a tactile feel control device as disclosed herein can include electrical, mechanical, or electromechanical components. For example, the tactile feel control device 320 can comprise a switch to perform the functions of a command module described herein. In another aspect, any or all of the components of a tactile feel control device can be controlled by machine readable instructions. For example, one or more of the bias module, the control module, and/or the feedback module can be under control of a digital processor operable with suitable software and/or firmware. In other words, in some embodiments, any or all of the elements of the tactile feel control device 320 can be computer controlled or executed by a computer. In addition, the tactile feel control device 320 can include an amplifier (not shown) configured to amplify the drive signal 351 for the electric motor 330. A digital drive signal can be converted to analog prior to such an amplifier.

In accordance with one embodiment of the present invention, a method for facilitating a desired tactile feel of a manually operatable device is disclosed. The method can comprise providing a bias module operable to generate a bias to be applied by an electric motor configured to be mechanically coupled to a manual control interface that is movable by a user, wherein the bias is configured to provide a desired tactile feel to the user at the manual control interface. The method can further comprise providing a control module operable to output a drive signal to the electric motor configured to apply the bias, wherein the bias is insufficient, alone, to cause movement of the manual control interface. Additionally, the method can comprise facilitating coupling of the control module and the electric motor, such that the drive signal is in communication with the electric motor. It is noted that no specific order is required in this method, though generally in one embodiment, these method steps can be carried out sequentially.

In one aspect, the method can further comprise facilitating initiation of the drive signal to the electric motor upon movement of the manual control interface by the user. In another aspect, the method can further comprise providing a sensor operable to sense at least one of position, velocity, and acceleration of the manual control interface to provide feedback for adjusting the bias.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A tactile feel control device, comprising:
an electric motor configured to be mechanically coupled to a manual control interface that is movable by a user;
a bias module operable to generate a bias to be applied by the electric motor, wherein the bias is configured to provide a desired tactile feel to the user at the manual control interface; and
a control module operable to output a drive signal to the electric motor configured to apply the bias, wherein the bias is insufficient, alone, to cause movement of the manual control interface.

2. The tactile feel control device of claim 1, wherein the control module comprises a motor drive module operable to output the drive signal as a pulse width modulation (PWM) signal to the electric motor based on the bias.

3. The tactile feel control device of claim 1, wherein movement of the manual control interface by the user initiates the drive signal to the electric motor.

4. The tactile feel control device of claim 3, further comprising a sensor operable to sense at least one of position, velocity, and acceleration of the manual control interface.

5. The tactile feel control device of claim 4, wherein the sensor is associated with the electric motor.

6. The tactile feel control device of claim 4, wherein the sensor is associated with the manual control interface.

7. The tactile feel control device of claim 4, further comprising a feedback module configured to provide feedback from the sensor for adjusting the bias.

8. The tactile feel control device of claim 1, wherein the control module is operable to alternately receive an external command from an external source, and wherein the drive signal is configured to apply the external command.

9. The tactile feel control device of claim 8, wherein movement of the manual control interface by the user is operable to override the external command and cause the drive signal to apply the bias.

10. The tactile feel control device of claim 1, wherein the control module comprises:
a command module configured to alternately apply the bias and the external command and output a drive command; and
a motor drive module to receive the drive command and output the drive signal.

11. The tactile feel control device of claim 10, wherein the drive command comprises at least one of a torque magnitude and a torque direction.

12. A manually operatable system, comprising:
a manual control interface that is movable by a user; and
a tactile feel control device, having
- an electric motor mechanically coupled to the manual control interface,
- a bias module operable to generate a bias to be applied by the electric motor, wherein the bias is configured to provide a desired tactile feel to the user at the manual control interface, and
- a control module operable to output a drive signal to the electric motor configured to apply the bias, wherein the bias is insufficient, alone, to cause movement of the manual control interface.

13. The system of claim 12, wherein the electric motor is mechanically coupled to the manual control interface via a drive mechanism.

14. The system of claim 13, further comprising a controllable element configured to be controlled by the manual control interface, wherein the drive mechanism is operable to move the controllable element.

15. The system of claim 14, wherein the controllable element comprises a lens.

16. The system of claim 12, further comprising a sensor configured to sense at least one of position, velocity, and acceleration of the manual control interface, wherein the sensor is operably coupled to a controllable element configured to be controlled by the manual control interface using sensor information.

17. The system of claim 16, wherein the controllable element comprises a directional control device for a vehicle.

18. A method for facilitating a desired tactile feel of a manually operatable device, comprising:
providing a bias module operable to generate a bias to be applied by an electric motor configured to be mechanically coupled to a manual control interface that is movable by a user, wherein the bias is configured to provide a desired tactile feel to the user at the manual control interface;
providing a control module operable to output a drive signal to the electric motor configured to apply the bias, wherein the bias is insufficient, alone, to cause movement of the manual control interface; and
facilitating coupling of the control module and the electric motor, such that the drive signal is in communication with the electric motor.

19. The method of claim 18, further comprising facilitating initiation of the drive signal to the electric motor upon movement of the manual control interface by the user.

20. The method of claim 19, further comprising providing a sensor operable to sense at least one of position, velocity, and acceleration of the manual control interface to provide feedback for adjusting the bias.

* * * * *